United States Patent
Desai et al.

(10) Patent No.: US 10,462,745 B2
(45) Date of Patent: Oct. 29, 2019

(54) SYSTEMS AND METHODS FOR EXTENDING BATTERY LIFE BY MONITORING DEVICE ACTIVITY

(71) Applicant: Google Inc., Mountain View, CA (US)

(72) Inventors: Meghan Desai, San Francisco, CA (US); Dianne Hackborn, Mountain View, CA (US); Paul Eastham, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/997,386

(22) Filed: Jan. 15, 2016

(65) Prior Publication Data

US 2017/0208549 A1 Jul. 20, 2017

(51) Int. Cl.
*H04W 52/02* (2009.01)
*H04W 76/28* (2018.01)
(Continued)

(52) U.S. Cl.
CPC ...... *H04W 52/0241* (2013.01); *G06F 1/3206* (2013.01); *G06F 1/3287* (2013.01);
(Continued)

(58) Field of Classification Search
None
See application file for complete search history.

(56) References Cited

U.S. PATENT DOCUMENTS

| 8,438,412 | B1 | 5/2013 | Givoly |
| 8,935,697 | B2 * | 1/2015 | Berry ............... G06F 1/3206 718/102 |

(Continued)

FOREIGN PATENT DOCUMENTS

| WO | 123414 | 7/2017 |
| WO | 2017123412 | 7/2017 |

OTHER PUBLICATIONS

Zayed Rehman, "How to Use Titanium Backup for Android [Complete Guide]", addictivetips, Typescript. Sep. 8, 2011, http://www.addictivetips.com/mobile/how-to-use-titanium-backup-for-android-complete-guide/ Last Accessed: Feb. 9, 2016.

(Continued)

*Primary Examiner* — Yemane Mesfin
*Assistant Examiner* — Jeff Banthrongsack
(74) *Attorney, Agent, or Firm* — Colby Nipper PLLC

(57) ABSTRACT

The disclosed technology includes techniques for preserving battery life of a mobile device by monitoring a mobile device to determine a state of inactivity. A state of inactivity may be determined if the screen of the mobile device is off and the mobile device remains stationary for a period of time. Battery life may be preserved by placing the mobile device and/or a mobile application of the mobile device into an idle state for successive idle periods separated by maintenance periods. When in an idle state, the mobile device and/or a mobile application of the mobile device may be prevented from utilizing various features or functions of the mobile device that may tend to drain the battery. The mobile device and/or mobile application may be granted temporary access to the various features and functions during the maintenance periods to temporarily allow the mobile device and/or mobile application to perform updates.

20 Claims, 3 Drawing Sheets

(51) Int. Cl.
    G06F 1/3206    (2019.01)
    G06F 1/3287    (2019.01)
(52) U.S. Cl.
    CPC ..... *H04W 52/027* (2013.01); *H04W 52/0254* (2013.01); *H04W 76/28* (2018.02); *Y02D 10/171* (2018.01); *Y02D 70/142* (2018.01); *Y02D 70/144* (2018.01); *Y02D 70/146* (2018.01); *Y02D 70/164* (2018.01); *Y02D 70/166* (2018.01)

(56) References Cited

U.S. PATENT DOCUMENTS

| | | | |
|---|---|---|---|
| 10,268,254 | B2 | 4/2019 | Desai et al. |
| 2010/0013551 | A1* | 1/2010 | Reams ............... H04N 5/4403 327/544 |
| 2010/0214278 | A1 | 8/2010 | Miura |
| 2011/0258467 | A1 | 10/2011 | Antoci |
| 2011/0291748 | A1 | 12/2011 | Li et al. |
| 2012/0159209 | A1 | 6/2012 | Stemen et al. |
| 2012/0210321 | A1* | 8/2012 | Silva ............... H04N 21/233 718/100 |
| 2013/0208417 | A1 | 8/2013 | Sirpal et al. |
| 2013/0252597 | A1 | 9/2013 | Jin et al. |
| 2015/0099546 | A1* | 4/2015 | Heo ............... H04W 4/02 455/456.3 |
| 2017/0205870 | A1 | 7/2017 | Rahman et al. |

OTHER PUBLICATIONS

Skipjacks, "[Guide] Insanely Better Battery Life When Idle—Battery Life Thread", xda, Typescript. Jul. 9, 2013, http://forum.xda-developers.com/showthread.php?t=2357417 Last Accessed: Feb. 9, 2016.

Briley Kenney, "[Android] Save battery by automatically turning off WiFi and Bluetooth when not in use with Wireless Minder" dotTech, Sep. 5, 2013, https://dottech.org/125862/android-review-wireless-minder-app/ Last Accessed: Feb. 9, 2016.

Matt "How to Extend Your Android Tablet's Battery Life When You're Not Using it", How-To Geek, Typescript. Mar. 4, 2015. Online at http://www.howtogeek.com/210993/how-to-extend-your-android-tablets-battery-life-when-youre-riot-using-it/ Last Accessed: Feb. 9, 2016.

Battery Doctor (Battery Saver), Cheetah Mobile Inc., Google Play Store. Typescript. Online at https://play.google.com/store/apps/details?id=com.ijinshan.kbatterydoctor_en&hl=en Last Accessed: Feb. 9, 2016.

Ahad Khan, "12 Apps for Longer Battery Life [Android]", Hongkiai, Typescript. Online at http://www.hongkiat.com/blog/android-app-save-battery/ Last Accessed: Feb. 9, 2016.

Online at https://play.google.com/store/search?q=battery&c=apps&hl=en. Last Accessed: Feb. 9, 2016.

"Samsung Galaxy S4 tips and tricks—Battery Life, Multi-tasking and Keyboard", Typescript. Online at http://www. trustedreviews.com/opinions/samsung-galaxy-s4-tips-and-tricks_Page-2. Last Accessed: Feb. 9, 2016.

"Greenify", Oasis Feng, Google Play Store. Online at https://play.google.com/store/apps/details?id=com.oasisfeng.greenify&feature=nav_result%20-%20?t=W251bGwsMSwyLDNd Last Accessed: Feb. 9, 2016.

Michael Elsdorfer, "Auto Starts", Google Play Store. Online at https://play.google.com/store/apps/details?id=com.elsdoerfer.android.autostarts&hl=en Last Accessed: Feb. 9, 2016.

"Greenify—Android Apps on Google Play", Retrieved at: https://play.google.com/store/apps/details?id=com.oasisfeng.greenify&feature=nav_result%20-%20?t=W251 bGwsMSwyLDNd—on Feb. 9, 2016.

"Battery Doctor (Battery Saver)", Cheetah Mobile, Inc. Google Play Store—Retrieved at—https://play.google.com/store/apps/details?id=com.ijinshan.kbatterydoctor_en&hl=en—on Feb. 9, 2016, 1 page.

"https://play.google.com/store/apps/details?id=com.elsdoerfer.android.autostarts&hl=en", Retrieved at: https://play.google.com/store/apps/details?id=com.elsdoerfer.android.autostarts&hl=en—on Feb. 9, 2016, 1 pages.

"Samsung Galaxy S4 tips and tricks—Battery Life, Multi-tasking and Keyboard", Retrieved at: http://www.trustedreviews.com/opinions/samsung-galaxy-s4-tips-and-tricks_Page-2—on Feb. 9, 2016, 12 pages.

"Battery Android Apps on Google Play", Retrieved at: https://play.google.com/store/search?q=battery&c=apps&hl=en—on Feb. 9, 2016, 3 pages.

"Non-Final Office Action", U.S. Appl. No. 14/997,451, dated Dec. 15, 2016, 8 pages.

Kenney,"[Android] Save battery by automatically turning off WiFi and Bluetooth when not in use with Wireless Minder", https://dottech.org/125862/android-review-wireless-minder-app/, Sep. 5, 2013, 5 pages.

Khan,"12 Apps for Longer Battery Life [Android]", Retrieved at: http://www.hongkiat.com/blog/android-app-save-battery/—on Feb. 9, 2016, 3 pages.

Klein,"How to Extend Your Android Tablet's Battery Life When You're Not Using it", https://www.howtogeek.com/210993/how-to-extend-your-android-tablets-battery-life-when-youre-not-using-it/, Mar. 4, 2015, 7 pages.

Skipjacks,"[GUIDE] Insanely Better Battery Life When Idle—Battery Life Thread", https://forum.xda-developers.com/showthread.php?t=2357417, Jul. 9, 2013, 16 pages.

Zayed,"How to Use Titanium Backup for Android [Complete Guide]", http://www.addictivetips.com/mobile/how-to-use-titaniurn-backup-for-android-cornplete-guide/, Sep. 8, 2011, 19 pages.

"Final Office Action", U.S. Appl. No. 14/997,451, dated Jun. 23, 2017, 10 pages.

"International Search Report and Written Opinion", Application No. PCT/US2016/068777, dated Mar. 23, 2017, 13 pages.

"International Search Report and Written Opinion", PCT Application No. PCT/US2016/068777, dated Mar. 23, 2017, 10 pages.

"Non-Final Office Action", U.S. Appl. No. 14/997,451, dated Nov. 22, 2017, 9 pages.

"Written Opinion", PCT Application No. PCT/US2016/068861, dated Jul. 20, 2017, 8 pages.

"Foreign Office Action", European Application No. 16826859.7, dated Aug. 22, 2013, 3 pages.

"Notice of Allowance", U.S. Appl. No. 14/997,451, dated Dec. 4, 2018, 8 pages.

"Foreign Office Action", Chinese Application 201710025903.9, dated May 5, 2019, 23 pages.

\* cited by examiner

SYSTEMS AND METHODS FOR EXTENDING BATTERY LIFE BY MONITORING DEVICE ACTIVITY

BACKGROUND

Mobile applications that run on smart phones, tablets, and other such mobile devices can present a significant drain on battery life of the device, particularly when the mobile applications are constantly running in the background and/or accessing communications resources, such as a Wi-Fi or cellular network transceiver. With the ubiquity and ever-increasing number of such mobile applications, it is desirable to provide ways to preserve or extend mobile device battery life in order to maximize the usefulness of a mobile device.

Previous solutions allow a user to manage battery life of a mobile device by manually disabling or limiting functionalities of a mobile application running on a mobile device. Other solutions allow a user to track which mobile applications or device features drain the most battery life so that a user may selectively disable the mobile application/feature when the battery is low. Further, many mobile devices have a "power save" mode that when selected, can turn off selected features and applications that tend to drain the battery of the device.

While these solutions may be somewhat useful in extending a mobile device's battery life, they are also limited in that they often require the user to actively monitor remaining battery life and proactively take steps to limit battery usage. Further, by entirely disabling features and applications, the utility and functionality of the mobile device may be greatly limited. Thus, it would be desirable to provide a way to passively reduce unnecessary drain on the battery life of a mobile device that only deactivates features or applications of the mobile device when they are not being used.

BRIEF DESCRIPTION OF THE FIGURES

Reference will now be made to the accompanying figures and flow diagrams, which are not necessarily drawn to scale, and wherein.

DETAILED DESCRIPTION

Figure 1:
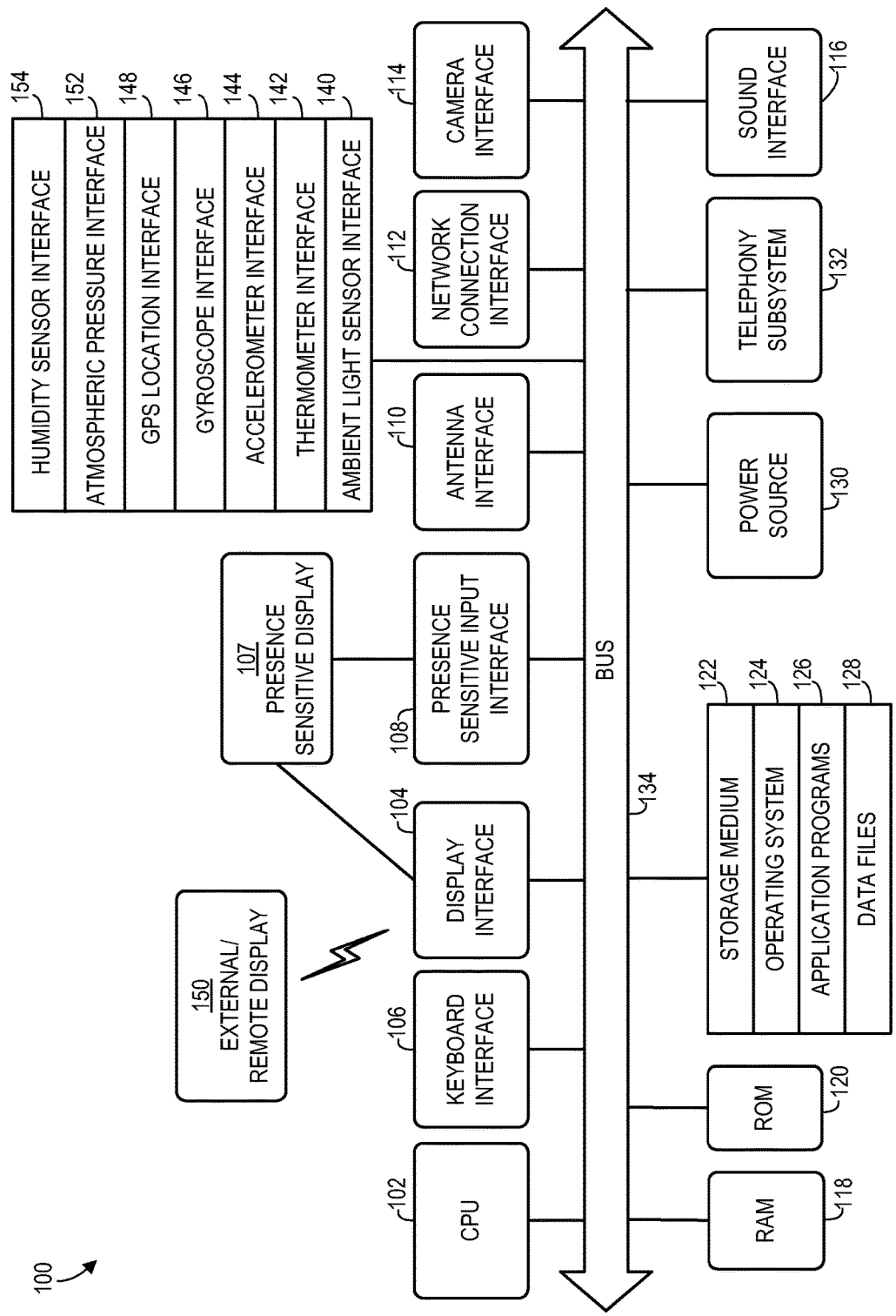
FIG. 1 is a block diagram of illustrative computing device architecture 100, according to an example implementation.

Some implementations of the disclosed technology will be described more fully with reference to the accompanying drawings. This disclosed technology may, however, be embodied in many different forms and should not be construed as limited to the implementations set forth herein.

Embodiments of the disclosed technology include systems and methods for preserving battery life of a mobile device by deferring computing and network activity for one or more mobile applications when the mobile device has gone unused for long period of time. This may be accomplished by monitoring the mobile device to determine whether the mobile device is in an inactive state. An inactive state may indicate that a user does not presently require active use of the mobile device. Thus, in situations where a user does not require active use of the mobile device, it may not be necessary for the mobile device or a mobile application of the mobile device to continue using certain battery draining features of the mobile device. As such, the mobile device or one or more applications of the mobile device may be placed in an idle state to preserve battery life if it is determined that the mobile device is in an inactive state. An idle state may preserve battery life by restricting the functions the mobile device or a mobile application may be able to perform.

A mobile device may be determined to be in an inactive state if certain conditions of the mobile device have persisted for a period of time. For example, a mobile device may be determined to be inactive if a processor determines that the device has been stationary and/or the screen has been off for a predetermined continuous period of time.

A mobile device or mobile application may be placed in an idle state for a plurality of successive idle periods, where each pair of successive idle periods is separated by a maintenance period. A maintenance period may be a limited period of time in which the mobile device or mobile application regains full access to the previously restricted features and functions of the mobile device in order to perform updates. Each successive idle period may be longer than the last, such that updates may be performed less frequently. The cycle of idle periods and maintenance periods may continue until the mobile device is finally determined to be in an active state again and full access to the previously restricted features and functions of the mobile device are restored to the mobile device and/or mobile applications.

Throughout this disclosure, certain embodiments are described in exemplary fashion in relation to a mobile device, such as a smart phone. However, embodiments of the disclosed technology are not so limited. In some embodiments, the disclosed technique may be effective in conserving battery power in other mobile devices, such as, for example tablets or laptops.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for extending the battery life of a mobile device by monitoring the mobile device to determine whether the mobile device is in an inactive state, and will now be described with reference to the accompanying figures.

Figure 2:
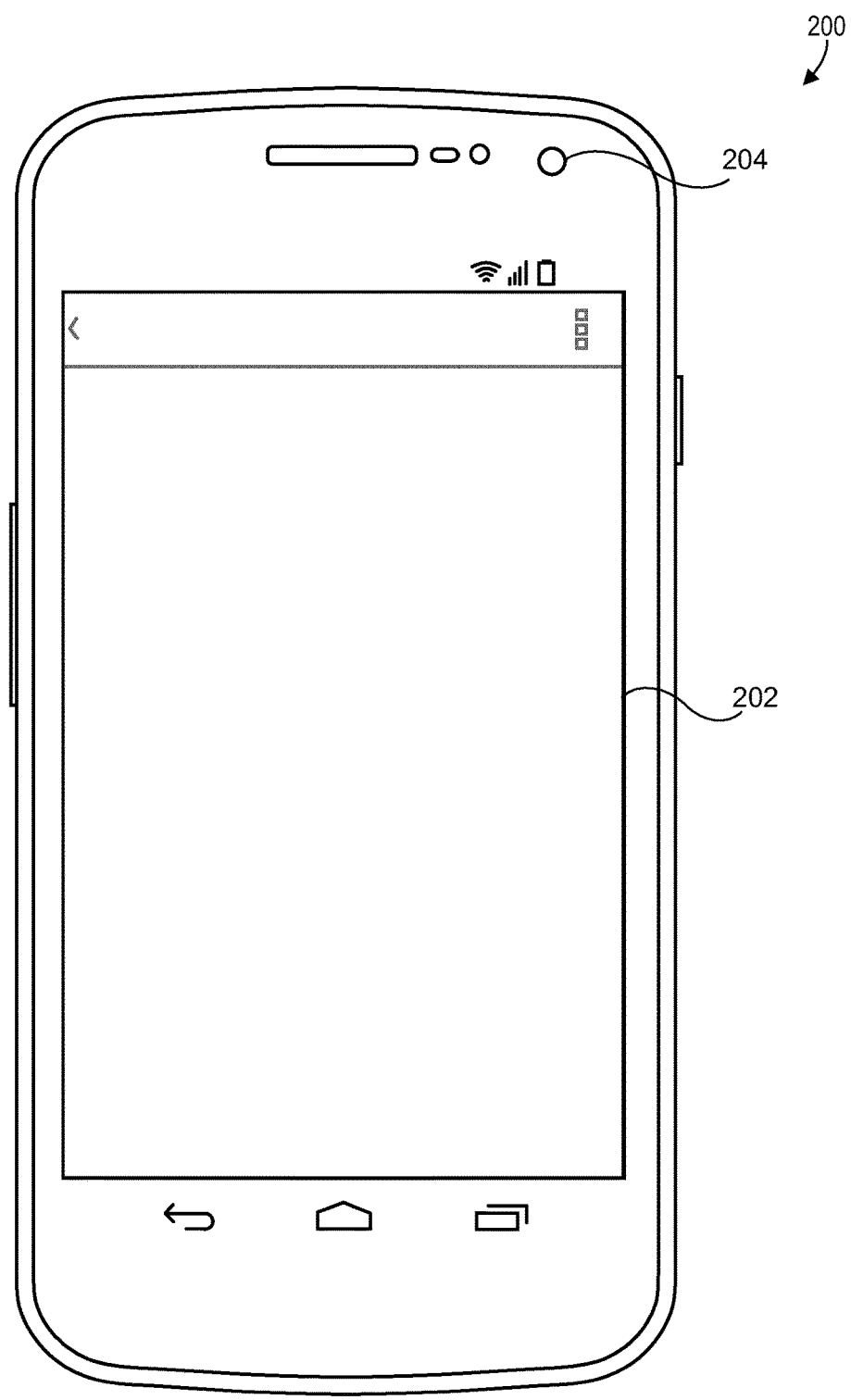
FIG. 2 illustrates a computing device 200, according to an example implementation

FIG. 1 depicts a block diagram of illustrative computing device architecture 100, according to an example embodiment. Certain aspects of FIG. 1 may be embodied in a computing device 200 (for example, a mobile computing device as shown in FIG. 2). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and texts on the display. In certain embodiments of the disclosed technology, the display interface 104 may be directly connected to a local display, such as a touch-screen display associated with a mobile computing device. In another example embodiment, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain some embodiments, the display interface 104 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a keyboard. In one example embodiment, the computing device architecture 100 may include a presence-sensitive display interface 108 for connecting to a presence-sensitive display 107. According to certain some embodiments of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. In certain embodiments, a camera interface 114 is provided that acts as a communication interface and provides functions for capturing digital images from a camera. In certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

Example embodiments of the computing device architecture 100 may include various interfaces that provide communication interfaces to various sensors for data gathering. In certain embodiments, an ambient light sensor interface 140 is provided as a communication interface and provides functions for obtaining light data from an ambient light sensor. In certain embodiments, a thermometer interface 142 is provided as a communication interface and provides functions for capturing temperature data from a temperature sensor. In certain embodiments, an accelerometer interface 144 is provided as a communication interface and provides functions for obtaining accelerometer data from an accelerometer. In certain embodiments, a gyroscope interface 146 is provided as a communication interface and provides functions for obtaining gyroscope data from a gyroscope. In certain embodiments, a GPS location interface 148 is provided as a communication interface and provides functions for obtaining location data from a GPS receiver. In certain embodiments, an atmospheric pressure interface 152 is provided as a communication interface and provides functions for obtaining pressure data from a pressure sensor. In certain embodiments, a humidity interface 154 is provided as a communication interface and provides functions for obtaining humidity data from a humidity sensor.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the transmission and receipt of sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the mobile computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a mobile computing device 200, according to an example embodiment. As shown in FIG. 2, the computing device may be a mobile computing device, for example, a smartphone or a tablet. The mobile computing device 200 may have a built-in or integrated display 202 ("screen") for presenting a graphical user interface (GUI) of a web browser. The display may be combined with a presence sensitive input device to form a touch-sensitive or presence-sensitive display for receiving user input from a stylus, finger, or other means of gesture input. In some embodiments, the mobile computing device 200 may also include or be associated with a sound producing device, such as a speaker, piezoelectric buzzer, or the like.

The mobile computing device 200 may be in communication with an image capture device 204 for capturing or recording content. As shown in FIG. 2, the computing device may include a built-in or internal image capture device, for example, a camera. The image capture device may include or be associated with an illumination device, for example, a flash device or IR beacon. In another example embodiment, the image capture device may be external to the computing device and in communication with the computing device, for example, through a direct connection, or wireless coupling.

In certain embodiments, the mobile computing device 200 may include one or more antennas or radios for wireless communication. These may include antennas for receiving GPS, Wi-Fi, or other radio communications. In addition, the mobile computing device may include one or more sensors for detecting, for example and without limitation, temperature, pressure, altitude, magnetic heading, etc.

As described herein, embodiments of the disclosed technology include techniques for extending the battery life of a mobile device by monitoring the mobile device to determine whether the mobile device in an inactive state. Battery life can be preserved for example, by placing the mobile device in an idle state where one or more features of the mobile device can be temporarily deactivated.

According to some embodiments, a processor of the mobile device can determine that the mobile device has been in an inactive state for a first period of time. According to some embodiments, a mobile device may be in an inactive state if the screen 202 of the mobile device has remained off for a specified continuous period of time. In some embodiments, the screen 202 may be considered to be off if a processor determines that there are no signals being output for display on screen 202. In some embodiments, the screen 202 may be considered to be off if a processor determines that the screen 202 is not receiving power.

In some embodiments, a mobile device may be in an inactive state if a processor determines that the mobile device has been stationary for a specified continuous period of time. According to some embodiments, the mobile device may be considered to be stationary if it does not move at all. In some embodiments, a mobile device can be considered to be stationary if it does not move faster than a threshold velocity or further than a threshold distance within a local environment. For example, in accordance with embodiments of the present disclosure, a mobile phone that is sitting in a cup holder in a moving vehicle and not being used by the user may be considered to be in an inactive state despite the fact that it may be experiencing small localized movements within the cup holder due to the jostling of the car, as well as experiencing the external velocity of the movement of the car. Those having skill in the art will understand that it is possible to use a processor receiving signals from various sensors of a mobile device, such as, for example, an accelerometer, a gyroscope, a GPS receiver, an orientation sensor, a compass, or any other suitable sensor, to determine whether a mobile device has experienced localized movements exceeding predefined velocity and distance thresholds over a first period of time. In some embodiments, it may not be desirable to place the mobile device in an inactive state if the mobile device is in a car, and therefore, the a processor receiving signals from various mobile device sensors may determine that the mobile device is moving in a car and may prevent the mobile device from being deemed to be in an inactive state.

According to some embodiments, a mobile device 200 may be in an inactive state if both (a) the screen 202 has remained off, and (b) the mobile device 200 has been stationary for a first period of time. For example, in some embodiments, a mobile device may be in an inactive state if the screen 202 has remained off and the mobile device 200 has been stationary for one hour. It should be understood that there may be many conditions that could be measured or detected in order to determine whether a mobile device 200 is inactive, and the conditions presented herein are merely illustrative.

As discussed above, according to some embodiments, a processor of a mobile device 200 can determine that the mobile device 200 has been in an inactive state for a first period of time. In some embodiments, if a processor determines that the mobile device has been in an inactive state for a first period of time, the processor may cause one or more mobile applications of the mobile device 200 to enter a first idle state for a second period of time. In some embodiments, an idle state can mean that certain features or functions of the mobile device 200 are deactivated. For example, in some embodiments, the processor may turn off a GPS receiver and prevent Wi-Fi scans from being performed. In some embodiments, an idle state can mean that a processor prevents one or more mobile applications from performing various functions or utilizing certain features of the device that may tend to drain the battery. In some embodiments, the idle state may mean that a processor may restrict a mobile application from network access, cause wakelocks of the mobile application to be ignored, and/or force syncs, jobs, and alarms to be deferred.

According to some embodiments, to prevent a mobile application from having network access, a processor of the mobile device may prevent the mobile application from utilizing a wireless transceiver of the mobile device to access, for example, a wireless or cellular network. For example, in some embodiments, there may be a firewall associated with a mobile application that determines whether or not the mobile application has network access. In some embodiments, the processor may activate the firewall to prevent the mobile application from having networks access. According to some embodiments, network access may refer to a mobile network, such as Wi-Fi, a cellular network, Bluetooth, WiMax, or any other such network.

A wakelock can be a function of a mobile application that allows the mobile application to control a power feature of a mobile device. For example, in some embodiments, a mobile application may activate one or more wakelocks to keep the CPU running, prevent the screen 202 from dimming, prevent the screen 202 from turning off, or prevent a keyboard backlight from turning off. According to embodiments of the present disclosure, a processor of the device may cause one or more wakelocks of a mobile application to be ignored by the mobile device when the device is in an idle state. Thus, in some embodiments, during an idle state, a mobile application may be restricted from, for example, keeping the CPU running, preventing the screen 202 to dim, preventing the screen 202 to turn off, or preventing a keyboard backlight from turning off.

In some embodiments, it may be typical for mobile applications to intermittently execute syncs, jobs, and alarms as a part of their normal functioning. For example, a sync or job may include retrieving an email, syncing a calendar item, or downloading an update to the application. An alarm executed by a mobile application may, for example, wake the CPU. According to embodiments of the present disclosure, a processor of the device may cause one or more sync, job, or alarm functions of a mobile application to be deferred when the mobile application is in an idle state. In some embodiments, the execution of the sync, job, or alarm functions can be deferred until a maintenance period following an idle period. In some embodiments, the execution of the sync, job, or alarm functions can be deferred until the mobile device becomes active again and exits the idle state. According to embodiments of the present disclosure, the operating system of the mobile device may buffer the sync, job, and alarm functions of a mobile application during the idle period for execution at a future time. In some embodiments, a processor may allow one or more alarms of a mobile application to trigger and execute during an idle state, while the processor may defer the execution of other alarms. For example, in some embodiments, alarms set by a mobile application using specific APIs or commands, for example, using a setAndAllowWhileIdle( ) API, may continue to trigger during an idle state, while alarms set by a mobile application using other APIs or commands, for example, using a setAlarm( ) API, may be deferred by a processor.

According to some embodiments, an alarm clock of the mobile device used to, for example, wake a user from sleep, may be set using a particular API, such as the setAlarmClock( ) API. In some embodiments, the triggering, by a processor, of an alarm clock alarm set using a particular API, such as the setAlarmClock( ) API, may cause a processor to cause a mobile application to exit the idle state. In some embodiments, responsive to the triggering of an impending alarm clock alarm, a processor of the mobile device may cause a mobile application to exit the idle state shortly before the triggering of the alarm clock alarm to allow pending syncs, jobs, and alarms to execute before triggering the alarm clock alarm. For example, in some embodiments, the processor may cause the mobile application to exit the idle state 5 seconds before the alarm clock alarm triggers.

As described above, in some embodiments of the present disclosure, a processor of a mobile device may place a mobile application into an idle state. The idle state may last for a period of time, which may be referred to as an idle period. As previously alluded to, according to some embodiments, there may be a plurality of successive idle periods. In some embodiments, each idle period can be followed by a maintenance period. According to some embodiments, a maintenance period can be a period of time during which a mobile application of the mobile device that was previously in an idle state may be temporarily removed from the idle state. For example, in some embodiments, during a maintenance period, a mobile application may be granted network access, may be allowed to utilize wakelocks effectively, and may execute syncs, jobs, and alarms that were deferred during the previous idle period. As will be appreciated, this cycle of idle periods followed by maintenance periods may allow a mobile device to preserve battery life while allowing mobile applications to periodically perform updates.

According to some embodiments, each successive idle period may have a greater duration than the last. For example, in some embodiments, a first idle period may last an hour, a second idle period may last two hours, a third idle period may last four hours, and a fourth idle period may last six hours. In some embodiments, a first idle period may be thirty seconds, a second idle period may be one minute, a third idle period may be two minutes, and a fourth idle period may be four minutes. In some embodiments, each successive idle period may have a duration that is twice as long as the previous idle period. As described above, each successive pair of idle periods may be separated by a maintenance period, during which a mobile application may be granted temporary access to the functions and features that were previously restricted during the idle period. According to some embodiments, each maintenance period may have the same duration as every other maintenance period. It should be understood that the times presented as the durations of the idle periods are merely examples, and one having skill in the art would recognize that and number of combinations of idle periods and maintenance periods having different durations may be contemplated the methods described herein. According to some embodiments, the mobile application of the mobile device may continue to alternative between idle periods and maintenance periods until such time as a processor of the mobile device determines that the mobile device is no longer in an inactive state.

As previously described, a processor may determine that a mobile device is in an inactive state if the screen 202 is off or the mobile device is stationary for a period of time. According to some embodiments, the mobile device may exit the inactive state and a mobile application of the device may cease the cycle of idle periods and maintenance periods if the mobile device becomes active. Accordingly, in some embodiments, if the mobile device exits the inactive state, the mobile device and/or any mobile application that has been placed in an idle state may exit the idle state and return to normal functionality. According to some embodiments, a processor may determine that the mobile device is in an active state, if the processor receives signals indicating that the screen 202 has been turned on. According to some embodiments, a processor may determine that the mobile device is in an active state if a processor receives signals indicating that the mobile device ceases to be stationary. For example, a processor may determine that the mobile device 200 is in motion in response to receiving signals from, for example, an accelerometer via an accelerometer interface 144, a gyroscope via a gyroscope interface 146, or a GPS receiver via a GPS location interface 148. In some embodiments, once a processor determines that a mobile device is in an inactive state, sensors of the mobile device may be utilized to monitor the motion of the mobile device to determine if the mobile device moves. If a processor receives signals from a sensor of the mobile device indicating that the mobile device is moving, the processor may remove the mobile device from the inactive state and place it in an active state. An active state may represent a state of the mobile device in which the mobile device and/or mobile applications may function in an unrestricted manner. For example, in an active state, a processor may turn on a GPS receiver of the mobile device and a processor may activate Wi-Fi scanning. According to some embodiments, a processor may remove mobile device from the inactive state and place it in an active state if one or more sensors of the mobile device detect any motion. In some embodiments, a processor may remove the mobile device from the inactive state and place it in an active state if one or more sensors of the mobile device detect movement of the mobile device that exceeds a threshold velocity or acceleration, or exceeds a threshold distance of movement within a specified time period. In some embodiments, the mobile device may be removed from the inactive state if the mobile device is plugged into a power source.

According to some embodiments, a processor may temporarily remove a mobile device or mobile application from an idle state in response to receiving a signal from another device or an application. For example, in some embodiments, if the mobile device receives a tickle, a processor of the mobile device may grant a mobile application network access and execute wakelocks of the mobile application for a brief period of time. According to some embodiments, a tickle may be a push message delivered by a push messaging service. In some embodiments, a processor may temporarily grant a mobile application network access and enable wakelocks to execute in response to receive a tickle. In some embodiments, the processor of the mobile device may grant the mobile application network access and execute wakelocks of the mobile application for a brief period of time only if the tickle is associated with a particular classification, such as for example, a "high priority" tickle.

There may be situations where a user may not want a particular mobile application to lose functionality when the mobile device is in a state of inactivity. Accordingly, in some embodiments, a processor of the mobile device may receive an indication of a user's desire to whitelist an individual mobile application. According to some embodiments, a processor may enable a whitelisted mobile application to retain some or all of the functionalities the mobile application otherwise would have lost when the processor places the mobile application in an idle state. For example, in some embodiments, a processor may enable a mobile application on the whitelist to use one or more wake locks, even thought the mobile application is in an idle state. In some embodiments, a processor may defer a whitelisted mobile application's jobs, syncs, and alarms as it normally would when in an idle state.

Figure 3:
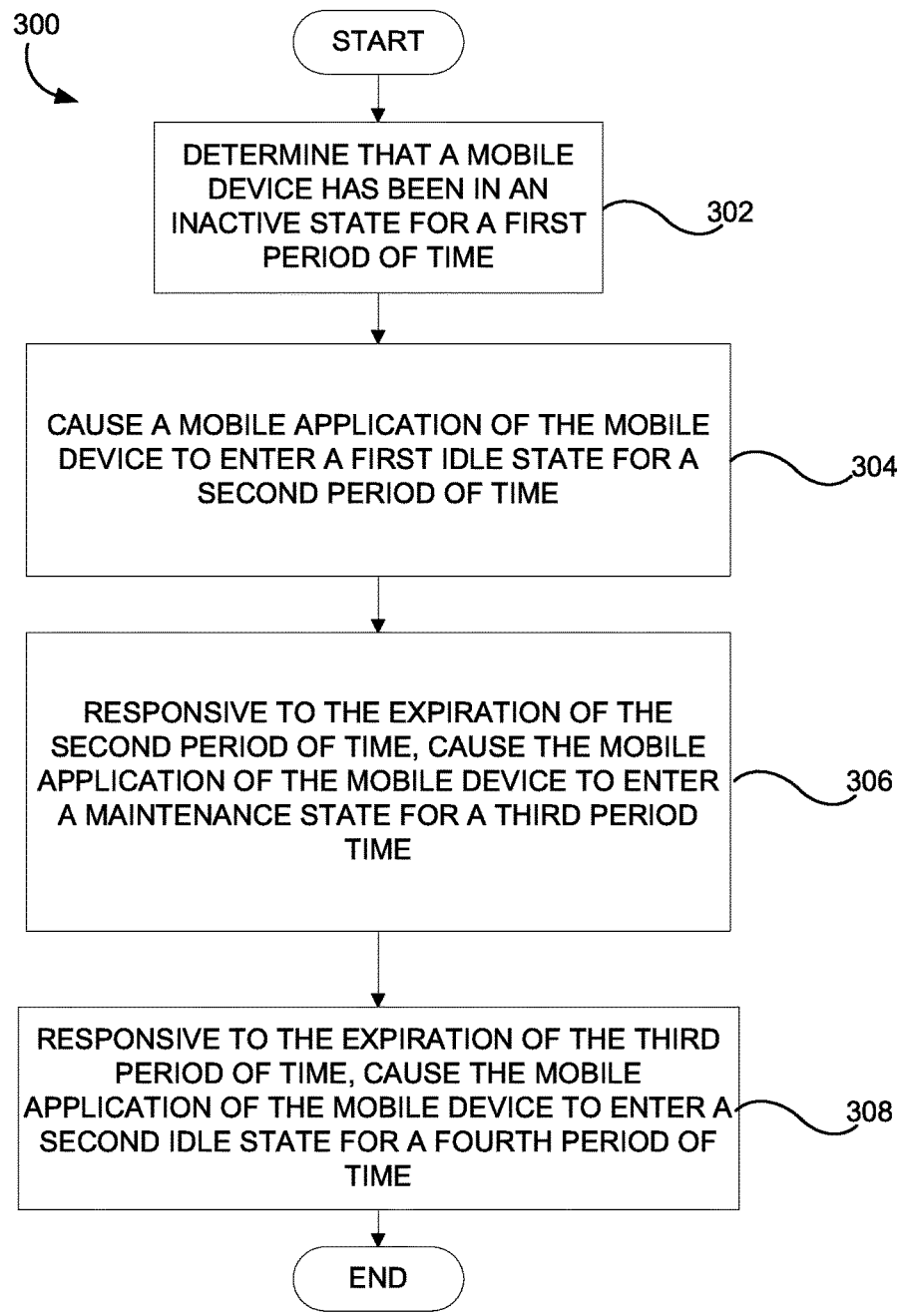
FIG. 3 is a flow diagram of a method 300, according to an example implementation.

FIG. 3 is a flow diagram of a method 300, according to an example implementation. As shown in FIG. 3, in some implementations, the method includes, determining 302 that a mobile device has been in an inactive state for a first period of time. According to some implementations, a mobile device may be in an inactive state if a processor determines that the screen 202 is off or the mobile device is stationary for the first period of time. The method can include causing 304 a mobile application of the mobile device to enter a first idle state for a second period of time. According to some implementations, the idle state may be a state of the mobile device in which certain mobile device and/or mobile application features or functions may be restricted, as described above. The method can include, responsive to the expiration second period of time, causing 306 the mobile application of the mobile device to enter a maintenance state for a third period of time. As described above, a maintenance state may be a state of the mobile device in which some or all of the mobile device and/or mobile application features and functions may be temporarily restored to allow the mobile device to perform updates. Lastly, the method can include, responsive to the expiration of the third period of time, causing 308 the mobile application of the mobile device to enter a second idle state for a fourth period of time.

It will be understood that the various steps shown in FIG. 3 are illustrative only, and that steps may be removed, other steps may be used, or the order of steps may be modified.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:
1. A method comprising:
   determining, by a processor, that a mobile device has been in an inactive state for a first period of time based on one or more signals indicating that the mobile device has not physically moved faster than a threshold velocity or further than a threshold distance within a local environment over the first period of time;

causing, by the processor and during the inactive state, a mobile application of the mobile device to enter a first idle state for a second period of time in response to the determining;

responsive to expiration of the second period of time, causing, by the processor and during the inactive state, the mobile application of the mobile device to exit the first idle state and enter a maintenance state for a third period of time;

responsive to expiration of the third period of time, causing, by the processor and during the inactive state, the mobile application of the mobile device to exit the maintenance state and enter a second idle state for a fourth period of time; and responsive to determining, by the processor, that the mobile device is no longer in the inactive state during the fourth period of time, causing, by the processor, the mobile application of the mobile device to exit the second idle state.

2. The method of claim 1, wherein determining that a mobile device has been in an inactive state for a first period of time includes considering the mobile device to be stationary for the first period of time based on the one or more signals.

3. The method of claim 1, wherein determining that a mobile device has been in an inactive state for a first period of time includes determining that a screen of the mobile device has remained off throughout the first period of time.

4. The method of claim 1, wherein causing a mobile application of the mobile device to enter a first or second idle state includes preventing the mobile application from accessing a mobile network.

5. The method of claim 1, wherein causing a mobile application of the mobile device to enter a first or second idle state includes preventing the mobile application from activating a wake lock.

6. The method of claim 1, wherein causing a mobile application of the mobile device to enter a first or second idle state includes preventing the mobile application from activating an alarm.

7. The method of claim 1, wherein causing a mobile application of the mobile device to enter a first or second idle state includes deactivating Wi-Fi scanning on the mobile device.

8. The method of claim 1, wherein causing a mobile application of the mobile device to enter a first or second idle state includes deactivating a GPS receiver of the mobile device.

9. The method of claim 1, wherein causing a mobile application of the mobile device to enter maintenance state includes allowing the mobile application to access a mobile network.

10. The method of claim 1, wherein causing a mobile application of the mobile device to enter maintenance state includes allowing the mobile application to activate an alarm.

11. The method of claim 1, wherein causing a mobile application of the mobile device to enter maintenance state includes activating Wi-Fi scanning on the mobile device.

12. The method of claim 1, wherein causing a mobile application of the mobile device to enter maintenance state includes activating a GPS receiver of the mobile device.

13. A system comprising:
one or more processors;
a memory coupled to the one or more processors and storing instructions that, when executed by the one or more processors, cause the system to:

determine that a mobile device has been in an inactive state for a first period of time based on one or more signals indicating that the mobile device has not physically moved faster than a predefined threshold velocity or farther than a predefined threshold distance within a local environment during the first period of time;

cause, during the inactive state, a mobile application of the mobile device to enter a first idle state for a second period of time;

responsive to the expiration of the second period of time and during the inactive state, cause the mobile application of the mobile device to exit the first idle state and enter a maintenance state for a third period of time;

responsive to the expiration of the third period of time and during the inactive state, cause the mobile application of the mobile device to exit the maintenance state and enter a second idle state for a fourth period of time; and responsive to a determination that the mobile device is no longer in the inactive state during the fourth period of time, cause the mobile application of the mobile device to exit the second idle state.

14. The system of claim 13, wherein determining that a mobile device has been in an inactive state for a first period of time includes considering the mobile device to be stationary for the first period of time if physical movements of the mobile device have not exceeded the predefined threshold velocity or the predefined threshold distance within the local environment over the first period of time.

15. The system of claim 13, wherein determining that a mobile device has been in an inactive state for a first period of time includes determining that a screen of the mobile device has remained off over the first period of time.

16. The system of claim 13, wherein causing a mobile application of the mobile device to enter a first or second idle state includes preventing the mobile application from accessing a mobile network.

17. A non-transitory computer-readable medium storing instructions that, when executed by one or more processors, cause a first computing device to:

determine that a mobile device has been in an inactive state for a first period of time based on sensor signals indicating that the mobile device has not physically moved faster than a predefined threshold velocity or further than a predefined threshold distance within a local environment over the first period of time;

cause, during the inactive state, a mobile application of the mobile device to enter a first idle state for a second period of time;

responsive to the expiration of the second period of time and during the inactive state, cause the mobile application of the mobile device to exit the first idle state and enter a maintenance state for a third period of time;

responsive to the expiration of the third period of time and during the inactive state, cause the mobile application of the mobile device to exit the maintenance state and enter a second idle state for a fourth period of time; and responsive to a determination that the mobile device is no longer in the inactive state during the fourth period of time, cause the mobile application of the mobile device to exit the second idle state.

18. The non-transitory computer-readable medium of claim 17, wherein determining that a mobile device has been in an inactive state for a first period of time includes determining that a screen of the mobile device has remained off throughout over the first period of time.

19. The non-transitory computer-readable medium of claim 17, wherein the sensor signals are generated by an accelerometer, a gyroscope, a global positioning systems (GPS) receiver, an orientation sensor, or a compass.

20. The system of claim 13, wherein causing a mobile application of the mobile device to enter a first or second idle state includes preventing the mobile application from activating a wake lock.

* * * * *